United States Patent [19]

Rhind et al.

[11] Patent Number: 4,985,900

[45] Date of Patent: Jan. 15, 1991

[54] NON-INTRUSIVE CHANNEL-IMPAIRMENT ANALYZER

[75] Inventors: William G. Rhind, Linlithgow; Norman G. Carder, Edinburgh, both of Scotland

[73] Assignee: Hewlett-Packard, Pinewood, England

[21] Appl. No.: 503,092

[22] Filed: Apr. 2, 1990

Related U.S. Application Data

[63] Continuation of Ser. No. 408,472, Sep. 15, 1989, abandoned, which is a continuation of Ser. No. 292,665, Dec. 29, 1988, abandoned, which is a continuation of Ser. No. 177,802, Apr. 8, 1988, abandoned, which is a continuation of Ser. No. 3,665, Jan. 15, 1987, abandoned.

[30] Foreign Application Priority Data

Jan. 18, 1986 [GB] United Kingdom ............... 8601210
Mar. 8, 1988 [GB] United Kingdom ............... 8605576

[51] Int. Cl.$^5$ ........................... H04B 3/46; H03H 7/30
[52] U.S. Cl. ........................................ 375/10; 375/15; 375/118; 333/18
[58] Field of Search ...................... 375/14, 15, 10, 118, 375/103; 364/724.01, 825, 724.2; 333/18

[56] References Cited

U.S. PATENT DOCUMENTS

| | | | |
|---|---|---|---|
| 3,727,134 | 4/1973 | Melvin | 375/14 |
| 4,273,970 | 6/1981 | Favin et al. | 328/162 |
| 4,381,546 | 4/1983 | Armstrong | 455/67 |
| 4,555,790 | 11/1985 | Betts et al. | 375/39 |
| 4,575,857 | 3/1986 | Murakami | 333/18 |
| 4,638,495 | 1/1987 | Mizoguchi | 375/14 |
| 4,639,939 | 1/1987 | Hirosaki et al. | 375/118 |

OTHER PUBLICATIONS

Michael Y. Levy, Christian L. Poinas, "Adaptive Phase Correctors for Data Transmission Receivers", CIT-ALCATEL Dept. Transmission, France, IEEE Jul., 1979: pp. 45.5.1 through 45.5.5.

Primary Examiner—Benedict V. Safourek
Assistant Examiner—Ralph Smith
Attorney, Agent, or Firm—Karl E. Bring

[57] ABSTRACT

A non-intrusive channel-impairment analyzer is provided for measuring at least one quasi-static impairment characteristic of a band-limited data communications channel. The analyzer comprises a data receiver section and a measurement section. The data receiver section is arranged to receive data modulated onto quadrature phases of a carrier signal in two quadrature forward processing paths. The receiver section includes a data recovery circuit for effecting a decision as to the identity of the original data on the basis of the outputs from said processing paths, and decision-directed compensation means disposed in said paths and arranged to compensate for channel-impairment effects on the received signal. The measurement section is responsive to signals generated in the receiver section during the receipt of random data, to derive a measurement of at least one said channel impairment, such as phase or amplitude jitter.

10 Claims, 10 Drawing Sheets

NON-INTRUSIVE CHANNEL-IMPAIRMENT ANALYZER

This is a continuation of application Ser. No. 408,472, filed Sept. 15, 1989, now abandoned, which is a continuation of application Ser. No. 292,665, filed on Dec. 29, 1988, now abandoned, which is a continuation of application Ser. No. 177,802, filed on Apr. 8, 1988, now abandoned, which is a continuation of application Ser. No. 003,665, filed on Jan. 15, 1987, now abandoned.

FIELD OF THE INVENTION

The present invention relates to a non-intrusive channel-impairment analyzer for measuring various quasi-static impairments in band-limited data channels without interruption of the channel traffic.

BACKGROUND OF THE INVENTION

The use of band-limited voice channels for the transmission of high-speed data signals has been made possible in recent years by the development of a range of modems which incorporate data receivers that compensate for the major impairing effects encountered on such channels. These high-speed modems generally make use of two-dimensional modulation techniques whereby groups of binary data for transmission are encoded into two-dimensional symbols (made up of 'in-phase' and 'quadrature' components) which are then transmitted by amplitude modulating two quadrature carrier signals. The closed set of two-dimensional data symbols characterizes the type of modulation scheme; typical examples are phase shift keying (PSK) and quadrature amplitude modulation (QAM). The two-dimensional symbols can conveniently be represented on a two-dimensional diagram (known in the art as a 'constellation' diagram) with the in-phase and quadrature components of each symbol being measured off along respective orthogonal axes. FIG. 1 of the accompanying drawings illustrates a '16-QAM' constellation where each symbol represents four binary bits of a data signal being transmitted.

The constellation diagram shown in FIG. 1 is, of course idealized. After the symbols have been transmitted over a voice-frequency data channel, the constellation diagram of the received symbols shows various distortions due to the effect of a range of quasi-static (or basically steady-state) and transient channel impairments.

Of the quasi-static impairments, linear distortion caused by the band-limiting filter action of the channel is potentially the most troublesome and manifests itself as interference between adjacent symbols in the received data signal. Such intersymbol interference (ISI) is normally minimized by means of an automatic adaptive equalizer incorporated within the data receiver. Without such equalization, however, the effect of channel linear distortion would be seen on a constellation diagram as a 'cloud of uncertainty' clustered around each constellation point (a similar effect is produced by additive background noise which co-exists with the data signal in the same spectral band). It should also be noted that as well as linear distortions, the channel will generally introduce second and third order non-linear distortions.

Two further significant quasi-static impairments are frequency offset and phase jitter which manifest themselves as a time-dependent variation in the reference phase of the data signal carrier wave. To minimize these effects, the data receiver normally includes a decision-directed phase-locked loop (PLL) which tracks variations in the reference phase of the data signal carrier wave. Without such a tracking device, the effects of frequency offset would be seen as a slow rotation of the constellation points about their origin, whilst the effect of phase jitter would be seen as an angular oscillation of the constellation points.

Another quasi-static impairment met in band-limited voice channels is amplitude jitter which manifests itself as a time-dependent variation in the level of the received data signal. It is possible to compensate for the effect of amplitude jitter by including within the data receiver a decision-directed gain-control-loop which tracks variations in the level of the received signal. Without such a control mechanism, however, the effect of amplitude jitter would be seen on the data constellation diagram as a radial oscillation of the constellation points.

A known method of measuring channel impairments is to apply tones of predetermined frequency and amplitude to the channel and then observe the signal received at the far end. This method has the considerable disadvantage of requiring an interruption in the normal channel traffic.

SUMMARY OF THE INVENTION

It is an object of the present invention to provide a non-intrusive channel-impairment analyzer for measuring at least one quasi-static impairment.

According to one aspect of the present invention, there is provided a non-intrusive channel-impairment analyzer for measuring at least one quasi-static impairment characteristic of a band-limited data communications channel, the analyzer comprising a data receiver section for receiving over said channel, data modulated onto quadrature phases of a carrier signal, the receiver section being arranged to process the received signal in two quadrature forward processing paths and including a data recovery circuit for effecting a decision as to the identity of the original data on the basis of the outputs from said processing paths, and decision-directed compensation means disposed in said paths and arranged to compensate for channel-impairment effects on the received signal; and a measurement section responsive to signals generated in the receiver section during the receipt of random data, to derive a measurement of at least one said channel impairment.

The compensation means of the receiver section will generally include a phase-locked loop operative to minimize the phase difference between the signals input to and output from the data recovery circuit, the phase-locked loop comprising a phase error generator, a loop filter, and a phase rotator connected into the forward processing paths of the data-receiver section. In this case, where the measurement section comprises phase jitter measurement means, a wideband phase error signal for use by the jitter measurement means can advantageously be derived by combining the output of the phase error generator.

For the measurement of jitter, whether amplitude jitter or phase jitter, the measurement system section preferably comprises jitter measurement means including generation means for generating an error signal indicative of the phase error or amplitude error between the input and output of the data-recovery circuit; and an adaptive line enhancer for isolating deterministic components of the error signal from background noise, the line enhancer comprising a fixed delay arranged to receive said error signal, a transversal filter fed from the fixed delay, a comparator for determining the difference between the enhancer input and the output of the transversal filter, and update means for adjusting the tap coefficients of the transversal filter such as to minimize the difference determined by the comparator means. Advantageously, where time constraints prevent updating of the tap coefficients every baud interval, these coefficients are updated at random multiples of the baud rate to ensure that the update rate does not conflict with a jitter component frequency.

For measuring second-order non-linearities the measurement system preferably includes error generating means for producing an error signal indicative of the vector difference between the input and output of the data recovery circuit; modulating means operative to frequency shift the error signal up to the frequency at which second-order non-linear distortion may have been introduced into the received signal; and averaging means arranged to produce an average value of the frequency-shifted error signal, the presence of a non-zero average being indicative of second-order non-linearities.

The frequency at which second-order non-linearities may have been introduced may differ from the frequency of the received carrier due to frequency offset impairment in the channel. In order to deal with this situation the modulating means advantageously comprises means arranged to frequency shift the error signal up to a frequency close to, or equal to, that of the received carrier signal, and means for progressively varying the frequency up to which the error signal has been shifted, through a range of frequencies lying on both sides of the frequency of the received carrier.

Preferably, steps are taken to counter the effects of third order non-linearities on the operation of the receiver. To this end, where the analyzer is provided with error generating means for generating an error signal dependent on the amplitude error between the input and output of the data recovery circuit, said error generating means advantageously includes third-order non-linearity compensation means arranged to modify said error signal by an amount dependent on the amplitude of the output of the data recovery circuit and a third-order non-linearity coefficient supplied to the non-linearity compensation means, whereby to reduce the effect on said error signal of third-order non-linear distortion introduced by the channel.

In order to derive a measure of the channel linear characteristics, the measurement section preferably includes a real-time channel model comprising an adaptive transversal model filter fed with the output of the data recovery circuit; demodulating means for demodulating an unequalized version of the signal received over the channel; comparison means for providing an error signal indicative of the difference between the output of the model filter and the output of said demodulating means; update means arranged to receive said error signal from the comparison means and to update the tap coefficients of the model filter such as to minimize said difference between the outputs of the model filter and the demodulating means; and Fourier transform means for deriving the channel linear characteristics from a Fourier transform of the tap coefficients of the model filter.

In deriving the model error signal, the comparison means of the channel model preferably includes third-order non-linearity compensation means arranged to modify said error signal by an amount dependent on the amplitude of the model output and a third-order non-linearity coefficient supplied to the non-linearity compensation means, whereby to reduce the effect on said error signal of third-order non-linear distortion introduced by the channel.

Where third-order non-linearity compensation means are provided in the analyzer, either in the model or elsewhere, then the analyzer advantageously further comprises coefficient determining means for adaptively determining said third-order non-linearity coefficient, the coefficient determining means being responsive to a.c. amplitude-error components of said error signal to update a previously derived value of said coefficient and this coefficient then being used by said third-order non-linearity compensation means.

BRIEF DESCRIPTION OF THE DRAWINGS

A channel-impairment analyzer embodying the present invention will now be particularly described, by way of non-limiting example, with reference to the accompanying diagrammatic drawings, in which.

DETAILED DESCRIPTION

Figure 2:
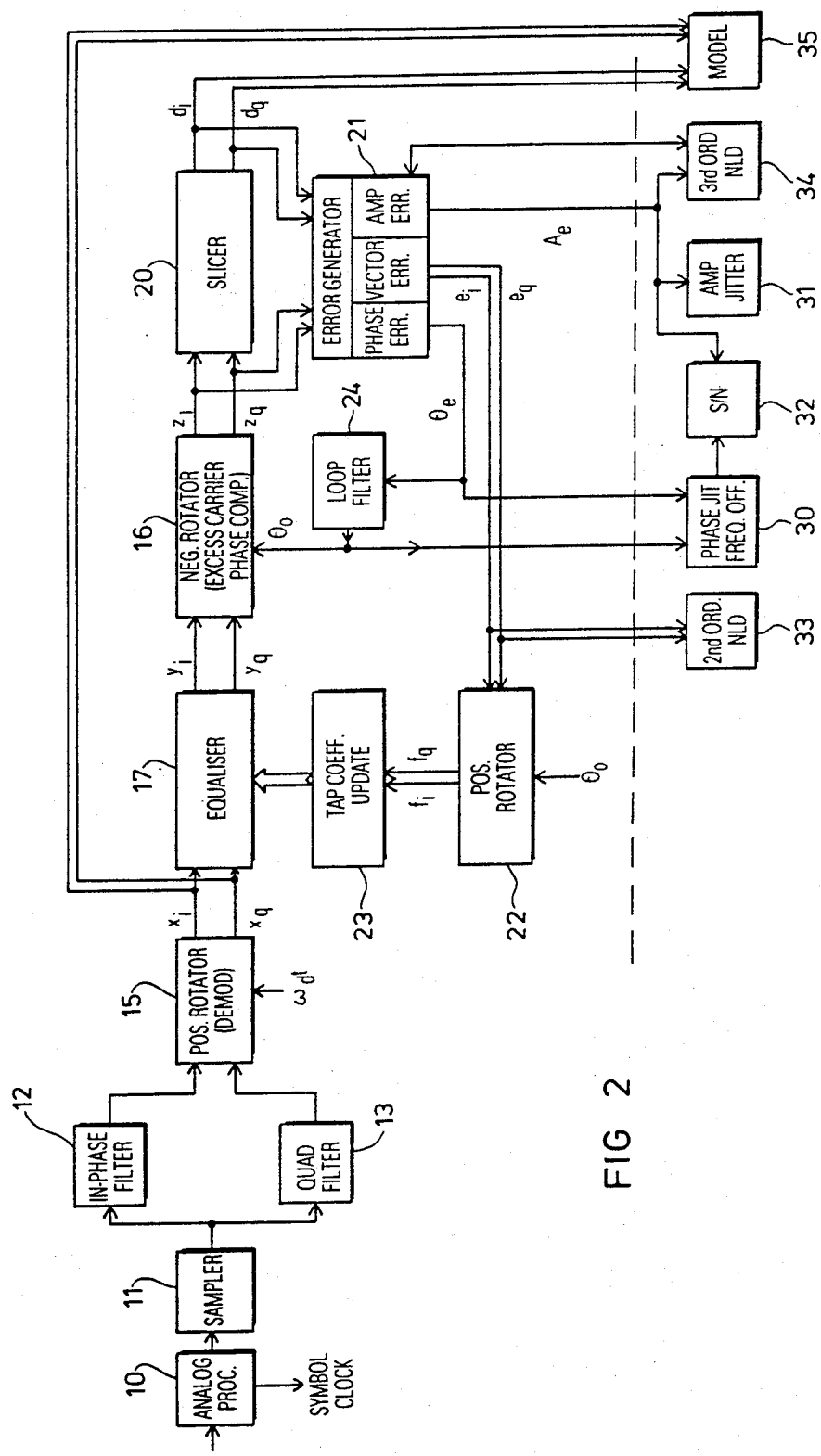
FIG. 2 is a block diagram of the channel-impairment analyzer showing the main component blocks of a data-receiver section and a measurement section of the analyzer.

The non-intrusive channel-impairment analyzer is shown in FIG. 2 in block diagram form. As can be seen, the analyzer is made-up of two sections, namely a data receiver section (upper half of FIG. 2 above dashed line) and a measurement section (lower half of FIG. 2).

THE RECEIVER SECTION

The data receiver section of the analyzer is based on the receiver type disclosed in U.S. Pat. No. 3,878,463 (Falconer et al) and, more particularly, corresponds closely to the implementation of that receiver type described by Falconer in Bell Systems Technical Journal Vol55, No.3, March 1976 at page 323. This latter implementation has, however, been modified in the FIG. 2 receiver section to incorporate a second order loop filter in the PLL used for phase correction, this modification being in accordance with the proposal by Levy and Poinas in a paper entitled "Adaptive Phase Correctors for Data Transmission Receivers".

As a detailed explanation of the functioning of the receiver section can be found in the source documents referred to above, only an outline of the receiver operation will be given herein to assist in the understanding of the nature of the signals passed to the measurement section of the analyzer.

The present analyzer is intended for use with voice-frequency channels carrying two-dimensional symbols modulated onto orthogonal phases ($sin\omega_c t$ and $cos\omega_c t$) of a common carrier of frequency $\omega_c$ at a rate $1/T$ where T is the baud (symbols per second) interval.

During each baud interval the data to be transmitted can be represented by the numbers I and Q, being the in-phase and quadrature components respectively of the corresponding symbol. The numbers I and Q can be considered as the components of an analytic signal R where $$R = I + jQ$$

The process of modulating the components I and Q into orthogonal phases of a common carrier may then be viewed as a multiplication of the signal R by the complex frequency $e^{j\omega_c t}$ to form a new complex signal S and then taking the real part as the real signal to be transmitted:

$$\begin{aligned} S &= R\, e^{j\omega_c t} \\ &= (I + jQ)\, e^{j\omega_c t} \\ &= (I\cos\omega_c t - Q\sin\omega_c t) + j(I\sin\omega_c t + Q\cos\omega_c t) \end{aligned}$$

In the receiver section of the analyzer, the received signal is first passed to analog signal conditioning circuitry 10 (including gain auto-ranging) before being sampled in sampler 11 at an even integer multiple of the symbol rate under the control of a symbol-clock recovery circuit (not shown). Subsequent signal processing is effected digitally either by circuitry dedicated to each processing function to be performed or by a suitably programmed, general purpose sampled data processor.

To recover the components I and Q in a data receiver supplied with the transmitted signal ($I\cos\omega_c t - Q\sin\omega_c t$), an analog to the imaginary part of the complex signal S is first derived by passing the received signal through a phase splitter made up of a pair of transversal filters 12, 13 operating at the sampling frequency. These filters are matched to the transmitted signal but differ in phase shift by 90°. The resulting outputs from the filters 12,13 correspond to:

Filter 12: $I\cos\omega_c t - Q\sin\omega_c t$

Filter 13: $I\sin\omega_c t + Q\cos\omega_c t$ that is, to the real and imaginary components of S. The two filter outputs taken together thus represent $R.e^{j\omega_c t}$.

Figure 3:
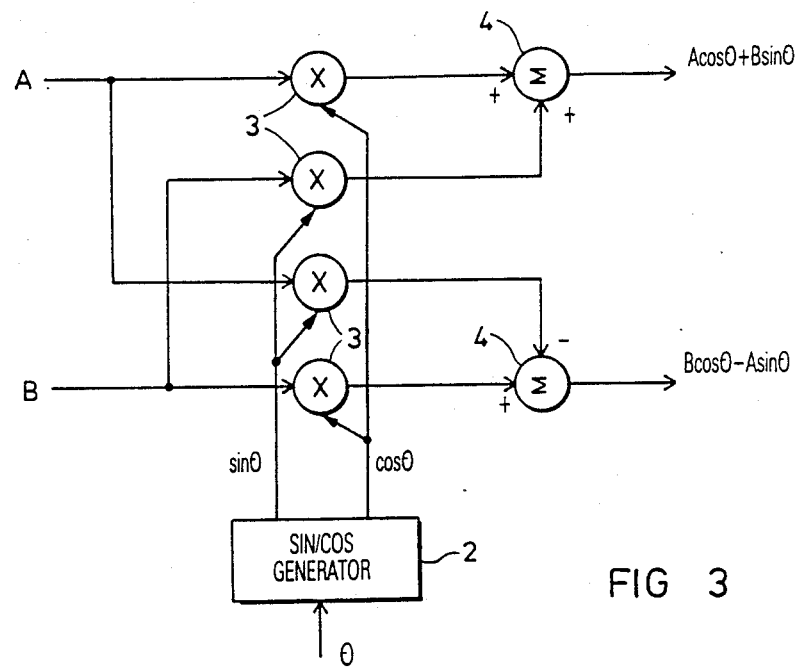
FIG. 3 is a functional block diagram of a negative phase rotator used in the data-receiver section of the analyzer to demodulate the received channel signal.

The components I and Q can now be recovered by multiplying the quantity $R.e^{j\omega_c t}$ by $e^{-j\omega_c t}$ leaving R or, in other words ($I + jQ$). Multiplication by $e^{-j\omega_c t}$ corresponds, of course, to a phase rotation by $-\theta^o$ where $\theta = \omega_c t$; FIG. 3 illustrates, in diagrammatic form, the implementation of a negative phase rotator for rotating a complex quantity ($A + jB$) by $-\theta^o$. This rotator comprises a sin/cos generator 2 for generating the quantity $sin\theta$ and $cos\theta$ corresponding to an input $\theta$; the generator 2 may, for example, be in the form of a look-up table (if only predetermined selected values of $\theta$ are to be used) or means for generating $sin\theta$ and $cos\theta$ by a power series expansion. The FIG. 3 rotator also includes multipliers 3 and adders 4 and it can be readily seen that the outputs of the rotator correspond to the real and imaginary parts of the multiplication $(A + jB)\, e^{-j\theta}$.

In the present receiver section, the output of the phase splitter (filters 12,13) is passed to a phase rotator 15 of the FIG. 3 form, which is arranged to effect a phase rotation corresponding to $(-\omega_d t)$ where $\omega_d$ is nominally equal to $\omega_c$. The phase rotator 15 is, of course, digital in form and operates at twice the baud rate.

In the absence of channel impairments, (in particular, frequency offsets and phase jitter), the output of the phase rotator 15 would be the signal R from which it will be appreciated that the rotator 15 serves as a demodulator.

In practice, the existence of channel impairment means that further processing of the complex-valued demodulator output signal X (in-phase and quadrature components $x_i$ and $x_q$ respectively) is required before the signal R can be reliably recovered. Following the demodulator 15 there are therefore provided two channel compensation stages, namely a channel equalizer 17 and an excess carrier phase compensator in the form of a phase rotator 16. As will be more fully explained below, both these compensation stages are decision-directed; that is, the compensation provided thereby is based on a decision as to the values of the transmitted data; this decision is taken by a slicer 20 which immediately follows the rotator 16.

Figure 4:
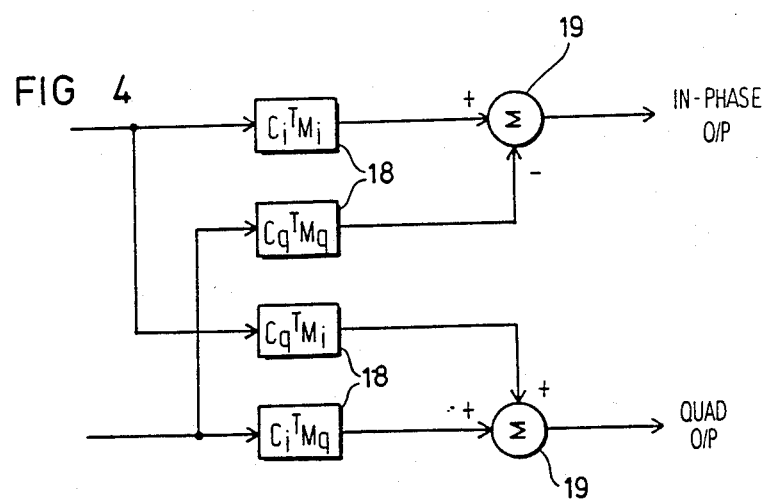
FIG. 4 is a functional block diagram of a complex-valued equalizer forming part of the analyzer data-receiver section.

The channel equalizer 17 takes the form of a complex-valued transversal filter, operated at twice baud, whose tap coefficients (in-phase and quadrature) are updated in such a way as to minimize a measure of the complex valued intersymbol interference introduced by the channel FIG. 4 diagrammatically depicts the processing structure of a complex-valued transversal filter and comprises four convolution blocks 18 and two summers 19 for generating the following output components (in vector notation) making up the complex-valued output signal Y.

In-phase output $y_i = c_i^T m_i - c_q^T m_q$

Quad-phase output $y_q = c_i^T m_q + c_q^T m_i$ where:

$c_i^T$ and $c_q^T$ are the transposed column vectors of the in-phase and quadrature tap-gain coefficients respectively, $m_i$ is the column vector of in-phase samples taken at taps along the in-phase delay line, and $m_q$ is the column vector of quadrature-phase samples taken at taps along the quadrature phase delay line.

The updating of the tap coefficients will be dealt with hereinafter.

The output Y of the adaptive channel equalizer is fed to the phase rotator which forms the excess carrier phase compensator 16. This rotator 16 forms part of a decision-controlled phase-locked loop intended to remove excess carrier phase rotation of R caused by frequency offset and phase jitter in the channel. The updating of the value of the phase rotation $-\theta_o$ effected by the phase rotator 16 is explained more fully below. The output of the rotator 16 is a complex-valued signal Z with in-phase and quadrature components of $z_i$ and $z_q$ respectively.

In spite of the compensation effected by the equalizer 17 and rotator 16, the complex-valued signal Z remains corrupted by residual uncompensated channel impairment effects such as background noise. The final stage of the data retrieval processing is, therefore, a slicing operation performed by the previously-mentioned slicer 20. The slicer 20 operates as a multi-level threshold detector for the in-phase and quadrature channels to provide a best estimate D of the transmitted two-dimensional data symbol; the in-phase and quadrature components, $d_i$ and $d_q$ respectively of the signal D are thus best estimates of the components I and Q of the transmitted signal. The form and operation of the slicer 20 are well understood by persons skilled in the art and will not be further described herein.

The updating of the channel compensation stages formed by the equalizer 17 and rotator 16 is effected in dependence on error signals derived by comparing the input and output signals Z and D of the slicer 20.

More particularly, to update the tap coefficients of the equalizer 17, a complex-valued vector error signal E having in-phase and quadrature components $e_i$ and $e_q$ respectively, is first derived in error generator block 21 in accordance with the following expressions:

$$e_i = z_i - d_i$$

$$e_q = z_q - d_q$$

Figure 11:
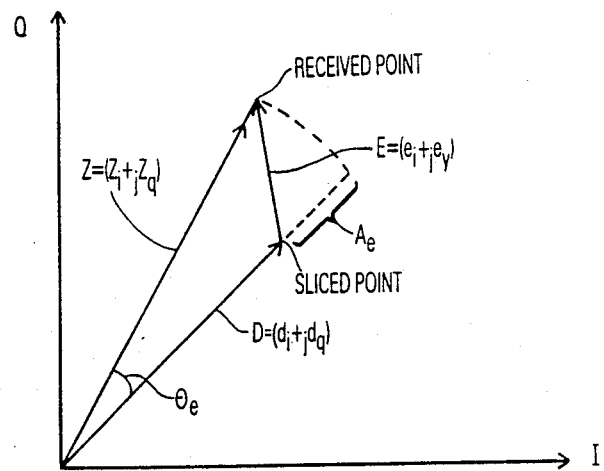
FIG. 11 is an in-phase/quad-phase graph illustrating the significance of various error signals derived in the analyzer.

FIG. 11 shows the inter-relation of the signals Z, D and E. Before this vector error signal E can be input into a tap update algorithm, it must be fed through a positive phase rotator 22 to reverse the effects of the excess carrier phase compensator 16 (the equalizer 17 being upstream of the compensator 16). The rotator 22 is similar in form to that shown in FIG. 3 but with the negative input to the lower summer 4 made positive and the corresponding input to the upper summer 4 made negative; this change is necessary to produce a positive rotation of $\theta$ rather than the negative rotation effected by the FIG. 3 circuit. The magnitude of rotation $\theta_o$ effected by the phase rotator 22 is thus equal and opposite to that effected by the compensator 16. The resultant error signal F (having in-phase and quadrature components of $f_i$ and $f_q$ respectively) is then used in a tap-update algorithm (block 23) of known form such as that described in the above-mentioned U.S. Pat. No. 3,878,468; according to the algorithm described in this latter document, the tap coefficients $c_i, c_q$ are adjusted in conformity with the following expressions:

$$c_i(n+1) = c_i(n) - \beta (f_i m_i + f_q m_q)$$

$$c_q(n+1) = c_q(n) - \beta (f_i m_q - f_q m_i)$$

where $n, (n+1)$ refer to successive baud intervals and $\beta$ is a constant.

For the adaptive equalization process to function properly and the equalizer tap coefficients to converge to their optimum values, the transmitted data must be random (this will generally be the case where a data scrambler is provided at the data transmitter). Once equalizer convergence has been, attained, the adaptive process allows the equalizer 17 to track slow variations in the channel.. characteristics; one result of this is that the equalizer serves as a narrow-band, decision-directed, gain control system. However, due to the range of possible interfering effects present in the error signal, the tap coefficients will exhibit some degree of uncertainty which results in a component of residual intersymbol interference in the received signal. Consequently, a compromise must be made in the selection of the update constant $\beta$ which determines both the tracking capability and the tap coefficient stability of the equalizer.

The updating of the phase-angle value $\theta_o$ fed to the excess carrier phase compensator 16 involves the derivation of a phase error signal $\theta_e$ by subtracting the phase angle of the slicer output from the phase angle of the slicer input (see FIG. 11). The slicer output phase angle corresponds to:

$$\text{slicer o/p angle} = \tan^{-1} \frac{d_q}{d_i}$$

This quantity can be held in a look-up table since there are only a limited number of slicer output combinations. On the other hand, the slicer-input phase angle:

$$\text{slicer i/p angle} = \tan^{-1} \frac{z_q}{z_i}$$

must be computed by a power series expansion as the in-phase and quadrature components of the slicer input may be in any relation. The derivation of the phase error signal $\theta_e$ is effected in the error generator block 21 of FIG. 2.

The phase error signal $\theta_e$ is passed to a loop filter 24 of the digital phase-locked loop composed of the rotator 16, error generator 21 and filter 24. The loop filter 24 is shown in greater detail in FIG. 5 and, as can be seen, the filter 24 is composed of summers 25, multipliers 26, and baud-interval (T) delays 27, arranged as a second order filter for providing a narrow-band phase output $\theta_e$ to control the phase rotator 16. More particularly, the output $\theta_o$ is updated in accordance with the following difference equations:

$$\theta_{o(n+1)} = \theta_{o(n)} + \alpha 1 \theta_{e(n)} + \dot{\theta}_{o(n)}$$

and $$\dot{\theta}_{o(n)} = \theta_{o(n-1)} + \alpha 2 \phi_{e(n)}$$

where $(n-1), n$, and $(n+1)$ refer to successive baud interval values of the corresponding quantities, and $\alpha_1$ and $\alpha_2$ are constants selected to maximize the training and tracking performance of the phase-locked loop.

The integral control introduced by the second order loop dynamics is present specifically to compensate for frequency offset which appears as a ramp in phase; the quantity $\theta_o$ is, indeed, a measure of frequency offset.

THE MEASUREMENT SECTION

As shown in FIG. 2, the measurement section of the channel-impairment analyzer comprises:
- a phase-jitter and frequency offset measurement block 30:
- an amplitude jitter measurement block 31;
- a signal/noise ratio measurement block 32;
- a 2nd order non-linearity measurement block 33;
- a 3rd order non-linearity measurement block 34; and
- a channel model block 35.

These measurement blocks will be described in turn below.

Phase Jitter and Frequency Offset

Figure 6:
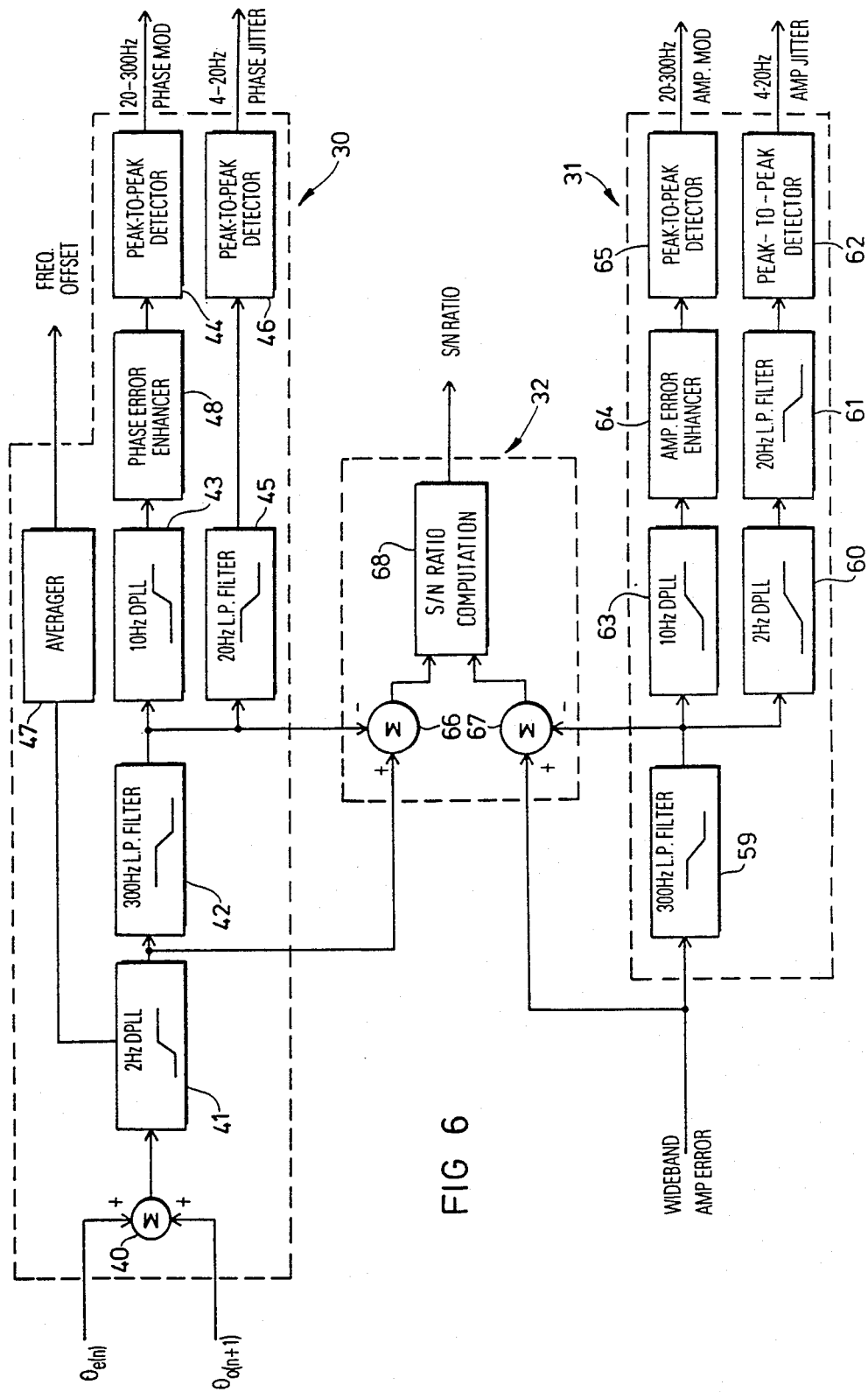
FIG. 6 is a functional block diagram of jitter and S/N ratio measurement blocks of the measurement section of the analyzer.

The phase jitter and frequency offset measurement block 30 is shown in more detail in FIG. 6. The first operation carried out in block 30 is to form a wideband phase error signal by combining in summer 40, the phase error signal $\theta_e$ from the error generator 21 and the narrow-band output signal $\theta_o$ from the PLL loop filter 24. This latter signal re-introduces into the phase error signal, information on low-frequency phase error removed by the action of the rotator 16 thereby enabling wideband phase-jitter measurements to be made which would not be the case if the signal $\theta_e$ had been used alone.

In fact, in the present analyzer, phase jitter measurements are carried out in two frequency bands, namely between 4 and 20 Hz and between 20 and 300 Hz. To this end, the wideband phase error signal is first passed through a 2 Hz narrowband digital phase-locked loop 41 to provide the 4 Hz lower measurement limit, and then through a transversal low-pass filter 42 providing the 300 Hz upper measurement limit. Thereafter, the 4–300 Hz band-limited signal is fed to two separate measurement channels that correspond to respective ones of the measurement bands. The 20–300 Hz channel comprises a 10 Hz DPLL providing a 20 Hz high pass filter 43, and a peak-to-peak detector 44. The 4–20 Hz channel comprises a 20 Hz transversal low-pass filter 45 followed by a peak-to-peak detector 46.

Figure 5:
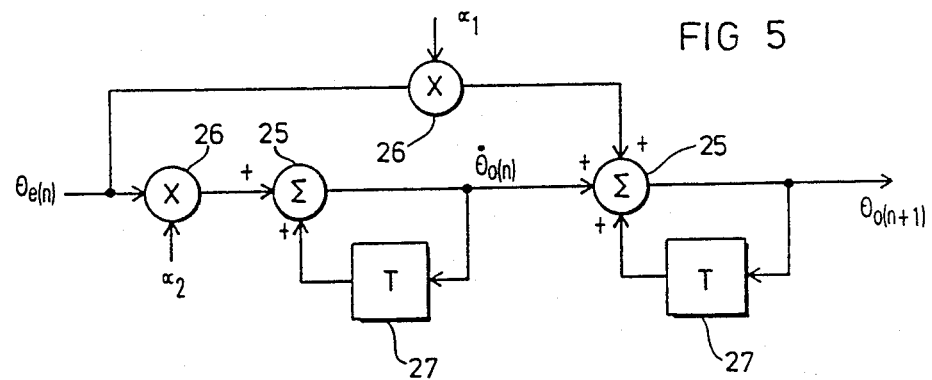
FIG. 5 shows the structure of a loop filter used in a digital phase-locked loop of the data-receiver section.

DPLLS 41, 43 are of a form similar to that shown in FIG. 5 for the loop filter 24 but with the constants $a_1$ and $a_2$ chosen to give the desired frequency-limiting characteristic rather than to give a particular tracking and training performance. The DPLL 41 is also used to derive a frequency offset signal in the manner previously described with reference to FIG. 5 (the desired signal being that corresponding to the signal $\theta_{o(n)}$ of FIG. 5). The frequency offset signal is passed to an averager 47 before being output.

Figure 1:
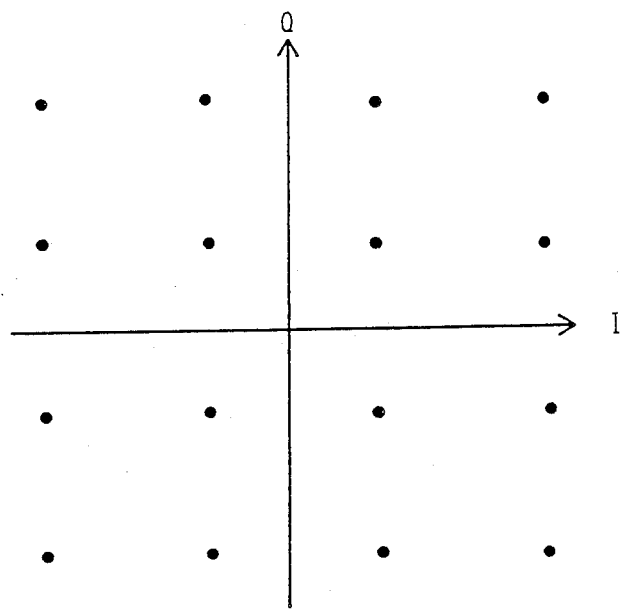
FIG. 1 is a 16-QAM constellation diagram.

As can be seen from FIG. 6, the 20–300 Hz phase jitter channel is provided with an adaptive line enhancer 48 the purpose of which is to remove background noise and other non-deterministic components in the phase error signal in this channel (the provision of a similar enhancer in the 4–20 Hz channel has been found to be unnecessary since the noise power in this narrower frequency band is much less). The problem of noise swamping the deterministic phase error components is particularly severe in the case of QAM constellations which have a set of inner data points as well as a set of outer data points (see, for example, the 16-QAM contellation of FIG. 1) since the same noise power produces a much larger phase error for the inner data points than the outer ones.

Figure 7:
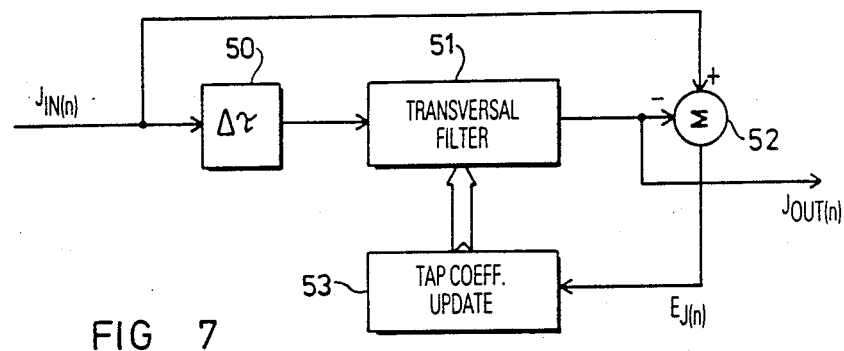
FIG. 7 shows the general structure of an adaptive line enhancer used in the jitter measurement blocks of FIG. 6.

The form of the adaptive line enhancer 48 is illustrated in FIG. 7. As can be seen, the enhancer comprises a delay ($\Delta Y$) 50 fed with the noise-corrupted jitter signal $J_{IN(n)}$, followed by a single-valued adaptive transversal filter 51 whose taps are spaced at the baud interval T. The input signal $J_{IN(n)}$ is compared in a comparator 52 with the output signal $J_{OUT(n)}$ from the filter 51 and the resultant error signal $E_{J(n)}$ is supplied to a tap coefficient update block 53. The block 53 implements a tap update algorithm of the same general form as used for the adaptive equalizer 17 but simplified for real components only.

The combined effect of the delay $\Delta Y$ and the filter phase shift is such that the deterministic components in the input and output signals of the line enhancer are phase coherent and cancel at the comparator 52. The delay $\Delta Y$ is chosen to ensure that there is no correlation between likely interfering signals in the input and output of the enhancer 48 so that these will not cancel at the comparator 52. Thus, at convergence, the error signal $E_{J(n)}$ should consist only of any interfering signal present at the input to the line enhancer 48 thereby giving the line enhancer a spectrum with narrow pass bands centered at the frequencies of the deterministic components. In practice, however, a small component of the deterministic signals appears in the error signal due to the filter output being slightly attenuated. It can in fact be shown that as the number of taps is increased, there is an increase both in the accuracy of the enhanced signal and in the frequency resolution of the filter.

Further description of this form of adaptive line enhancer may be found in an article entitled "Adaptive Noise Cancelling Principles and Applications" (Widrow et al), page 1692, Vol.63, No.12, Proceedings of the IEEE, December 1975.

As previously noted, the sampled data processing effected in the analyzer may be carried out by circuitry dedicated to each particular function indicated in the accompanying FIGURES or by a general purpose sampled data processor. In this latter case, time constraints will normally make it difficult to update the tap coefficients of the line enhancer 48 during every baud interval and updating will generally therefore be done on a multiplexed basis with other processing tasks which are not absolutely required to be effected every baud interval. It has, however, been found that the line enhancer 48 is susceptible to producing misleading results if this multiplexed tap updating is carried out at fixed, regular intervals; the reason for this is that the interval chosen may be related to the frequency of a deterministic jitter component with the result that updating repeatedly occurs at the same phase of that component and the latter is therefore effectively ignored. To overcome this difficulty, the number of baud intervals between updating of the line enhancer 48 is randomised in any suitable manner.

Amplitude Jitter

The amplitude jitter measurement block 31 is shown in more detail in FIG. 6. The input to block 31 is a wideband amplitude error signal $A_e$ (see FIG. 11) formed in the error generator 21 by subtracting the amplitude of the slicer output from that of the slicer input:

$$A_e = (z_i^2 + z_q^2)^{\frac{1}{2}} - (d_i^2 + d_q^2)^{\frac{1}{2}}$$

The term $(d_i^2 + d_q^2)^{\frac{1}{2}}$ can be obtained using a look-up table as there are only a limited number of possible outputs from the slicer 20. The term $(z_i^2 + z_q^2)^{\frac{1}{2}}$ is most readily determined in the form:

$$z_i \left( 1 + \frac{z_q^2}{z_i^2} \right)^{\frac{1}{2}}$$

as the quantity $z_q/z_i$ will have been previously calculated during derivation of the phase error signal $\theta_e$ (see before).

In fact, the signal $A_e$ will not include very low frequency components as these will generally have been tracked out by preceding stages of the data receiver.

As will be described hereinafter, the amplitude error signal is also subject to compensation for third order nonlinear distortion (NLD) prior to being passed to the amplitude jitter measurement block 31, this compensation being effected in the error generator 21 as a result of feedback from the third-order non-linearity measurement block 34.

The processing of the wideband amplitude error in block 31 is similar to the processing of the phase error in block 30. More particularly, the amplitude error, after passage through a 300 Hz transversal, low-pass filter 59, is processed in two channels, one for frequencies in the range 4–20 Hz and the other for frequencies in the range 20–300 Hz. The 4–20 Hz channel comprises a 2 Hz DPLL 60, a 20 Hz, transversal, low-pass filter 61, and a peak-to-peak detector 62. The 20–300 Hz channel comprises a 10 Hz DPLL 63, an adaptive line enhancer 64 similar to the line enhancer shown in FIG. 7, and a peak-to-peak detector 65.

Signal-to-Noise Ratio

The S/N ratio measurement block 32 is shown in more detail in FIG. 6. The computation of S/N ratio is based on the approximation:

$$S/N = [(\text{Phase error})^2 + K(\text{amp error})^2] K_{scale}$$

In order to exclude jitter modulation components from inclusions in the noise, only phase and amplitude error components above 300 Hz are used to calculate the S/N ratio (it being expected that modulation components will generally be below this frequency). To generate the required phase error signals, the output of the 300 Hz low-pass filter 42 is subtracted from the filter input in block 66; similarly the required amplitude error signal is generated by subtracting the output of the 300 Hz low-pass filter 59 from the input to the filter in block 67. The outputs of blocks 66 and 67 are passed to a processing block 68 for computation of the S/N ratio in accordance with the expression given above. To compensate for the fact that the bottom 300 Hz have been removed from the error signals, a scaling factor is introduced As mentioned above, for a QAM constellation including both inner and outer sets of points, the effect of noise is exaggerated for the inner set of points. For such constellations, therefore, a further scaling factor is introduced to correct for this effect.

2nd Order Non-Linearity

While linear distortions introduced by the channel will be largely compensated for by the equalizer 17, this is not the case for second and third order non-linear distortions.

Figure 8A:
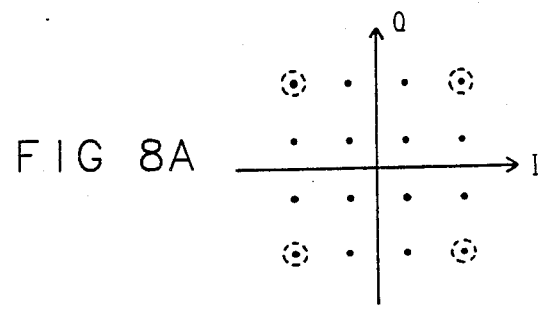
FIGS. 8a, 8b, 8c are in-phase/quad-phase component graphs illustrating the principle of operation of a second-order non-linearity measurement block of the analyzer measurement section.
Figure 8B:
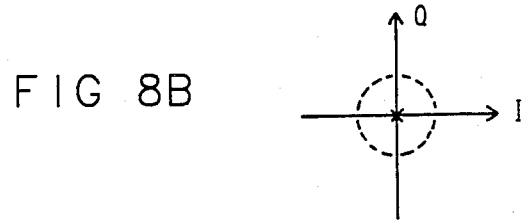
Figure 8C:
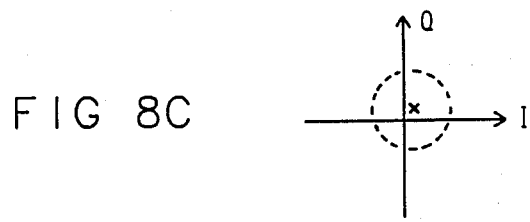

With regard to second-order non-linear distortions, the Applicants have observed that such non-linearities can be revealed and measured by remodulating the vector error components $e_i, e_q$ (see FIG. 2) of the outer corner points of a QAM constellation (see points ringed by dashed circles in FIG. 8a) up to the frequency at which 2nd order non-linearities may have been introduced. Assuming a distribution of the original data points, the remodulated error components will either:

produce a random distribution of points having no particular bias (that is, if the remodulated error points are plotted on an in-phase component/quad-phase component graph, the resultant cluster of points will have its centroid at the origin as indicated in FIG. 8b); or produce a biased distribution of points with the centroid of the points cluster offset from the origin of an in-phase/quad-phase component graph (see FIG. 8c).

This latter condition is indicative of the presence of second-order non-linearities with the magnitude of the offset being a measure of the non-linearities.

Owing to the fact that the channel may introduce a frequency offset either before or after the introduction of second-order non-linearities, the frequency to which the vector error components must be remodulated will not necessarily be the frequency of the signal received at the analyzer. This problem can be overcome by remodulating the error components to the received-signal frequency (carrier nominal plus detected offset) and then slowly sweeping the remodulation frequency through a few Hertz either side of the received-signal frequency while monitoring the position of the points cluster centroid. If any second-order non-linearities are present, then the points cluster centroid will exhibit an offset which peaks at a particular value of the remodulation frequency; the centroid offset at this frequency can be considered as an indication of the magnitude of non-linearity present.

Figure 9:
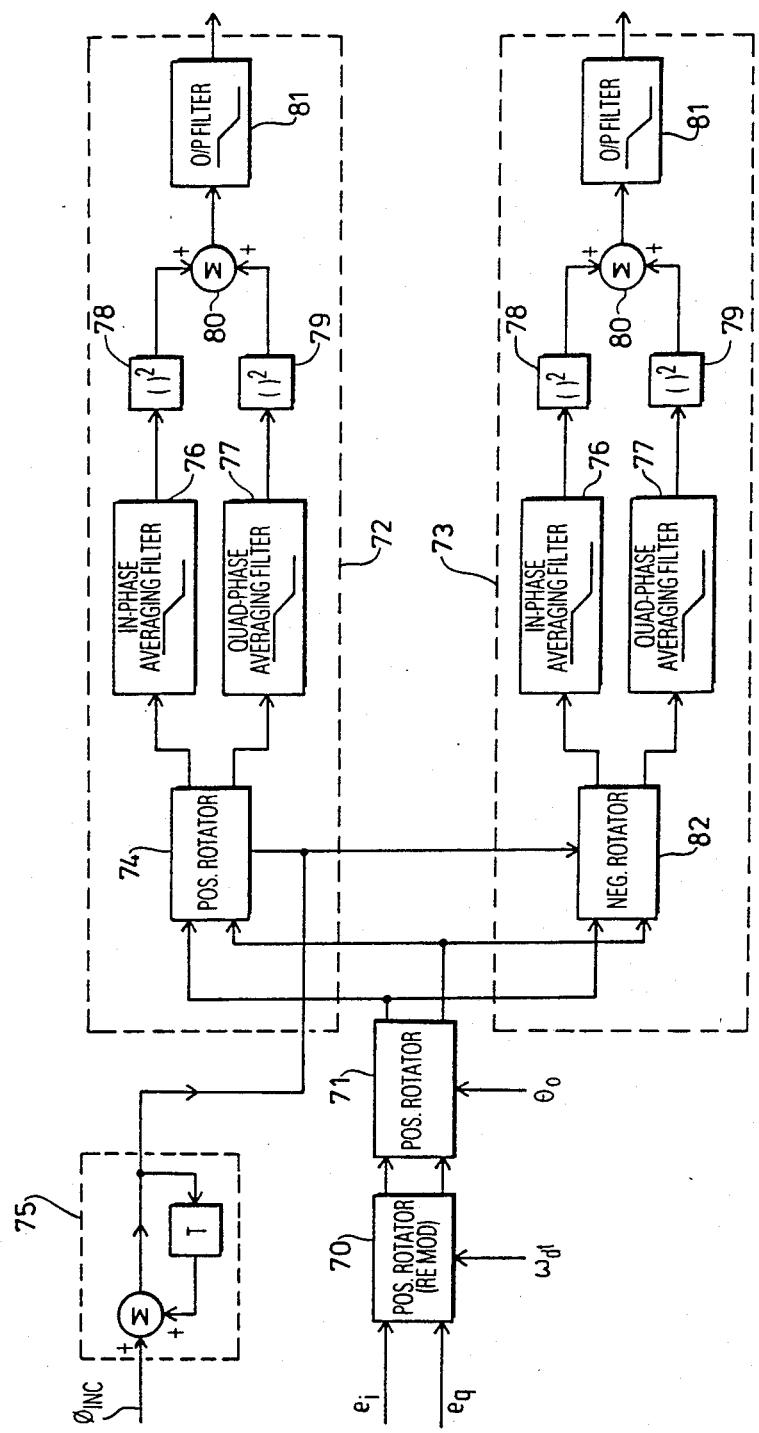
FIG. 9 is a functional block diagram of the second-order non-linearity measurement section.

FIG. 9 shows, in functional block diagram form, a processing arrangement for implementing the foregoing method of detecting second-order non-linearities. The vector error components $e_i, e_q$ of each outer corner point that occurs (as detected by the slicer 20), are fed first to a positive phase rotator 70 for remodulation to the nominal carrier frequency $\omega_d$ and then to a positive phase rotator 71 for further modulation in correspondence to the detected frequency offset (as embodied in the signal $\theta_o$). The in-phase and quad-phase components output from the rotator 71 are thus at the frequency received by the analyzer. These components are then passed to two separate channels 72, 73 respectively arranged to increase and decrease the modulation frequency in $\frac{1}{4}$ Hz steps from 0 to 7 Hz and to search for any resultant centroid offset.

The channel 72 comprises a positive phase rotator 74 controlled by the output of an integrator 75 that is fed with a phase angle value $\phi_{INC}$. For constant $\phi_{INC}$, the phase angle supplied to the rotator 74 will increase simulating a frequency determined by the magnitude of $\phi_{INC}$. By changing the magnitude of $\phi_{INC}$ at intervals, the frequency produced can be swept between 0 and 7 Hz in the desired ¼ Hz steps. The in-phase and quadphase outputs of the rotator 74 are passed to respective averaging filters 76,77 and then to respective squaring circuits 78,79 before being summed in summer 80. The output of the summer 80 feeds a low-pass output filter 81.

The channel 73 is similar to the channel 72 except that a negative phase rotator 82 is provided instead of the positive phase rotator 74; as a result, progressive increases in $\phi_{INC}$ result in the frequency change introduced in channel 73 being in a negative sense. The remaining components of channel 73 are the same as for channel 72 and have, therefore, been similarly referenced in FIG. 9.

If a second-order non-linearity has been introduced by the channel into the originally transmitted signal, then as $\phi_{INC}$ is increased to increase the frequency change introduced by the rotator 74,82, the output of one of the channels 80 or 81 will increase to a maximum as the frequency in that channel matches the frequency at which the distortion was introduced. This maximum is taken as a measure of the magnitude of the second-order non-linearity present in the channel.

3rd Order Non-Linearity

The presence of third-order non-linearities is most noticeable in its effect on the outer corner points of a QAM constellation, these points being significantly radially expanded or compressed in the presence of such non-linearities. To compensate for this effect, the previously stated expression for calculating the wideband amplitude error $A_e$ is modified to:

$$A_e = (z_i^2 + z_q^2)^{1/2} - [(d_i^2 + d_q^2)^{1/2} + C_3(d_i^2 + d_q^2)^{3/2}]$$

where $C_3$ is a third-order non-linearity coefficient. The functional blocks required to derive $A_e$ in accordance with the above expression are illustrated in the upper half of FIG. 10 and comprise processor blocks 90,91,92, summers 93,94, multiplier 95, and divider 96 (the purpose of the latter being to normalize the derived value of $A_e$ by division by the amplitude value of the sliced point).

Figure 10:
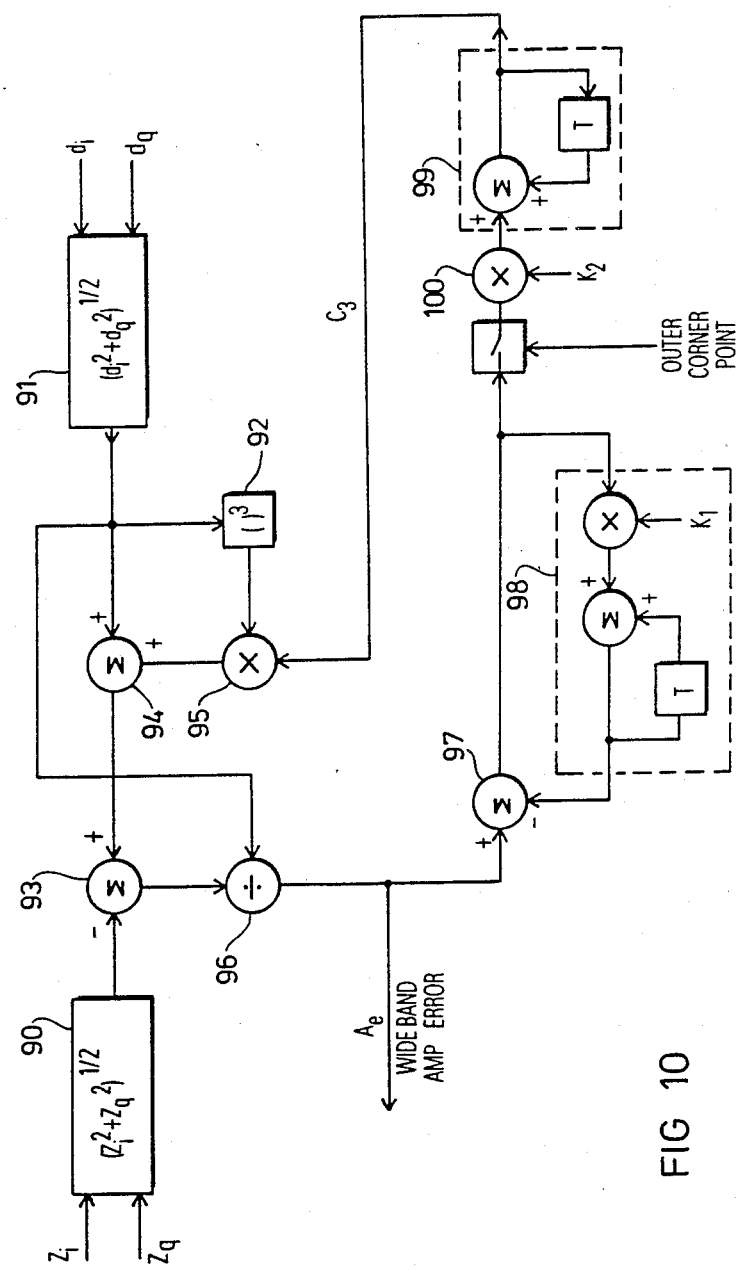
FIG. 10 is a functional block diagram of a third-order non-linearity measurement block of the analyzer measurement section and illustrates the use of the output of that block to effect third-order non-linearity compensation in the determination of an amplitude error signal.

The derivation of the third-order non-linearity coefficient $C_3$ is effected by the functional blocks illustrated in the lower half of FIG. 10. The normalized amplitude error $A_e$ is first passed to a digital phase-locked loop made up of summer 97 and an integrating loop filter 98 with update constant $K_1$, to remove any dc component from the amplitude error (this loop is updated every baud interval). The average output from the summer 97 is thus zero. If an outer, corner constellation point has been sliced, the output from the summer 97 is used to update the value of the third-order non-linearity coefficient $C_3$ by means of an integrator 99 constituted by a first-order DPLL with an update constant $K_2$ provided by an input multiplier 100. The constants $K_1$ and $K_2$ are small.

If no third-order non-linearity is present in the received signal then $C_3$ will converge to zero. However, if compressive third-order non-linearities are present, $C_3$ will converge to a negative value, whereas if expansive third-order, non-linearities are present, $C_3$ will converge to a positive value.

Channel Model

The channel model block 35 is provided to facilitate the measurement of channel linear distortion.

Figure 12:
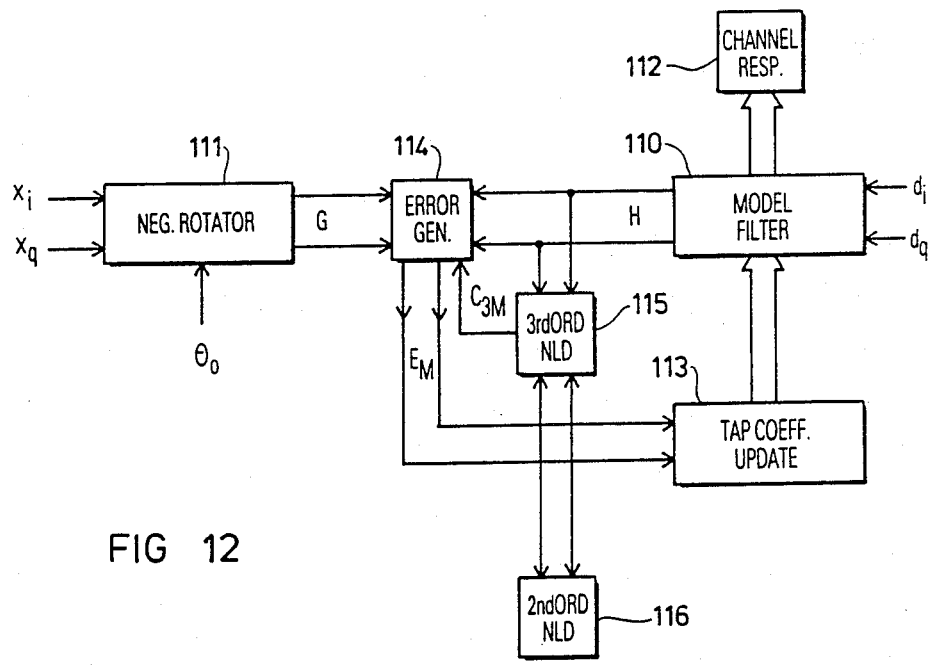
FIG. 12 is a functional block diagram of a channel model block of the analyzer measurement section.

The general arrangement of the channel model block 35 is shown in FIG. 12. The model is built around an adaptive complex-valued model filter 110 which is fed with the output signal D (components $d_i, d_q$) from the data-receiver slicer 20. The taps of the filter 110 are adjusted to minimize the error between the output of the model filter 110 and the output X (components $x_i, x_q$) of the data-receiver demodulator 15 after rotation of this latter output to compensate for excess carrier phase $\theta_o$ (this compensation is effected by a negative rotator 111). Once convergence of the model filter 110 has been attained, the filter models the channel linear distortion and will track slow variations in the channel characteristics. By performing a Fast Fourier Transform on the tap coefficients of the model filter 110, the channel's frequency characteristic can then be derived (this is represented by block 112 in FIG. 12).

It will, of course, be appreciated that the signals X, D and $\theta_o$ required by the model must be delay-matched before being supplied to the model.

The form of the model filter 110 is substantially the same as that illustrated in FIG. 4 for the equalizer 17. To avoid aliasing, the model processing is carried out at twice baud rate. In practice, the complex-valued input signal supplied to the model is obtained by sampling the output of the slicer 20 at T-spaced intervals and interleaving these samples with zero samples This has the advantage that alternate outputs are associated with odd and even taps, so for the purposes of tap updating the filter 110 can be considered as two filters each with half the number of taps. The updating process itself (block 113 in FIG. 12) is effected in accordance with the same algorithm as is used for the equalizer 17.

The generation of the model vector-error signal $E_M$ (components of $e_{Mi}, e_{Mq}$) supplied to the tap coefficient update block 113 is effected in error generator 114 and includes compensation for third-order non-linearity as represented by a coefficient $C_{3M}$ derived in block 115.

Designating the output of the rotator 111 by the complex variable G (components of $g_i$ and $g_q$) and the output of the model filter 110 by the complex variable H (components of $h_i$ and $h_q$), the model error $E_M$ is derived in accordance with the following expression:

Model Error = Received point − [Model o/p + 3rd NLD comp.]

$(e_{Mi} + je_{Mq}) = (g_i + jg_q) − [(h_i + jh_q) + C_{3M}r^3(\cos\psi + j\sin\psi)]$ where r and $\psi$ are respectively the amplitude and phase of the model filter output, Since:

$$r = (h_i^2 + h_q^2)^{\frac{1}{2}}; \cos\psi = \frac{h_i}{r}; \sin\psi = \frac{h_q}{r}$$

the preceding expression can be written as:

$(e_{Mi} + je_{Mq}) =$ $(g_i + jg_q) − [(h_i + j)h_q + C_{3M}(h_i^2 + h_q^2)(h_i + jh_q)]$

This expression is, of course, not of the same form as that given earlier in relation to 3rd order NLD compensation of the amplitude error $A_e$ in block 21; this difference is due to the wholly different nature of the error signals concerned as may be appreciated by reference to FIG. 11 where the present vector error signal $E_M$ is akin to the vector E rather than the scaler $A_e$.

Figure 13:
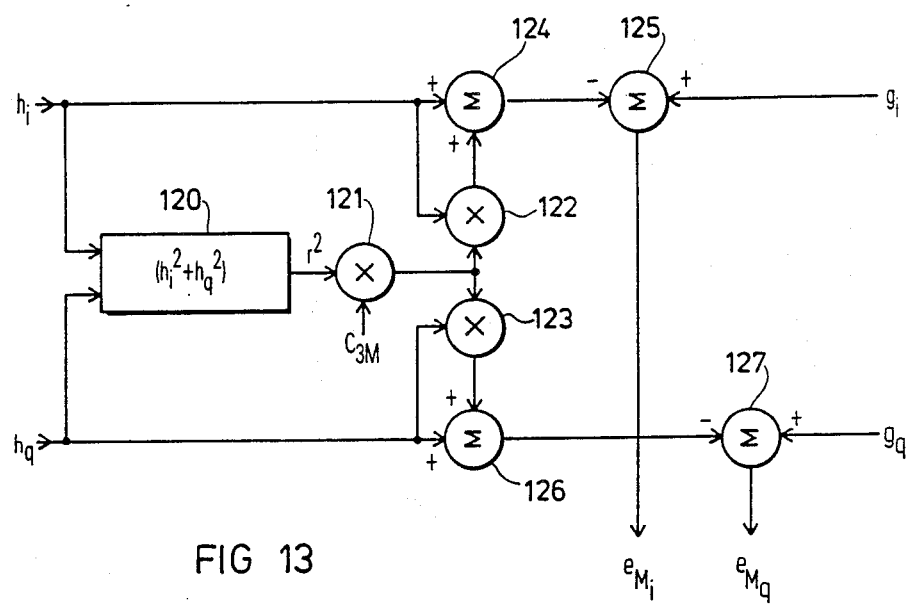
FIG. 13 is a functional block diagram of an error generator used in the FIG. 12 channel model.

FIG. 13 shows in detail the main processing blocks of the error generator 114. These blocks comprise a block 120 for deriving the quantity $r^2$, multipliers 121,122,123 and summers 124,125,126 and 127.

A similar compensation for third-order non-linearities may also be efffected in deriving the vector error E in the receiver section of the analyzer.

The model third-order non-linearity coefficient $C_{3M}$ is derived in block 115 the same way as the coefficient $C_3$ is derived in block 34. Thus, referring to FIG. 14, the block 115 can be seen to include a processing portion 132 corresponding to the part of FIG. 10 that illustrates the arrangement for deriving $C_3$ from the wideband amplitude error $A_e$. The processing portion 132, like the corresponding portion of FIG. 10, requires for its input a scaler signal representing amplitude error rather than the vector error. Accordingly, the block 115 is provided with an arrangement for converting the model vector error $E_M$ (components $e_{Mi}, e_{Mq}$) into a model amplitude error $A_{Me}$. The principle behind the conversion operation can be understood by reference to FIG. 11 in which the variables D,Z,E and $A_e$ bear the same general inter-relationship as the variables H,G,$E_M$ and $A_{Me}$ of the model. If, for the sake of simplicity, the 3rd order non-linear distortion compensation term in the vector error $E_M$ (analogous to E of FIG. 11) is ignored, then, the model amplitude error $A_{Me}$ ($A_e$, FIG. 11) can be obtained by rotating the vector error clockwise by the phase angle of the vector H (D, FIG. 11) and taking the real part:

$$A_{Me} = R_e \left[(e_{Mi} + j e_{Mq})(\cos\psi - j\sin\psi)\right]$$

where $\psi$ is the phase angle of the vector M.

Figure 14:
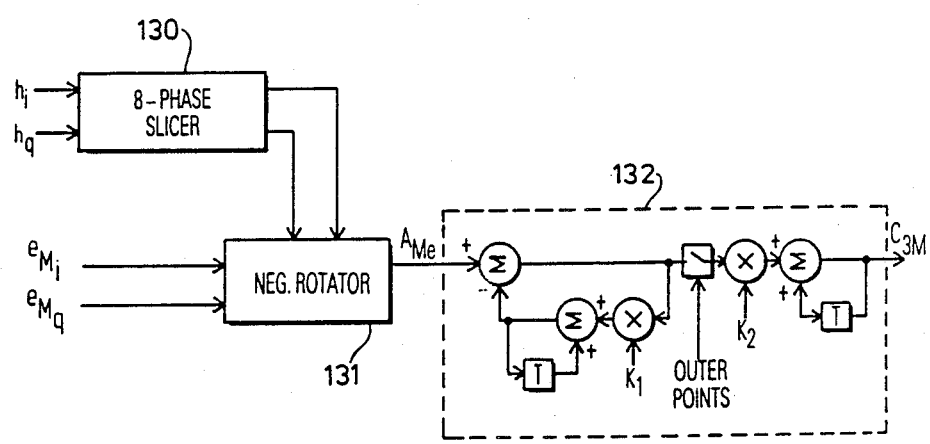
FIG. 14 is a functional block diagram of a third-order non-linearity measurement block of the FIG. 12 channel model.

This rotation through $\psi$ is effected in FIG. 14 by the negative rotator 131. However, since the calculation of $\cos\psi$ and $\sin\psi$ by a power series expansion involves significant processing time, in the present embodiment rather than computing exact values for $\cos\psi$ and $\sin\psi$, an approximate angle value is derived by means of an eight-phase slicer 130 fed with the signal components $h_i$ and $h_q$. The in-phase and quadrature output components are then used directly in the rotator 131 without the need for a sin/cos generator. With this arrangement, there is a possibility of a rotation error of 22.5° maximum.

The output of the $C_{3M}$ derivation block, as well as being used in the model error generator 114, may also be made available externally.

As is illustrated in FIG. 12, the model may also be provided with a block 116 for deriving a model second-order non-linearity measurement. This block operates in the same general manner as the block 33 and will, therefore, not be further described herein.

SAMPLED-DATA PROCESSOR

Figure 15:
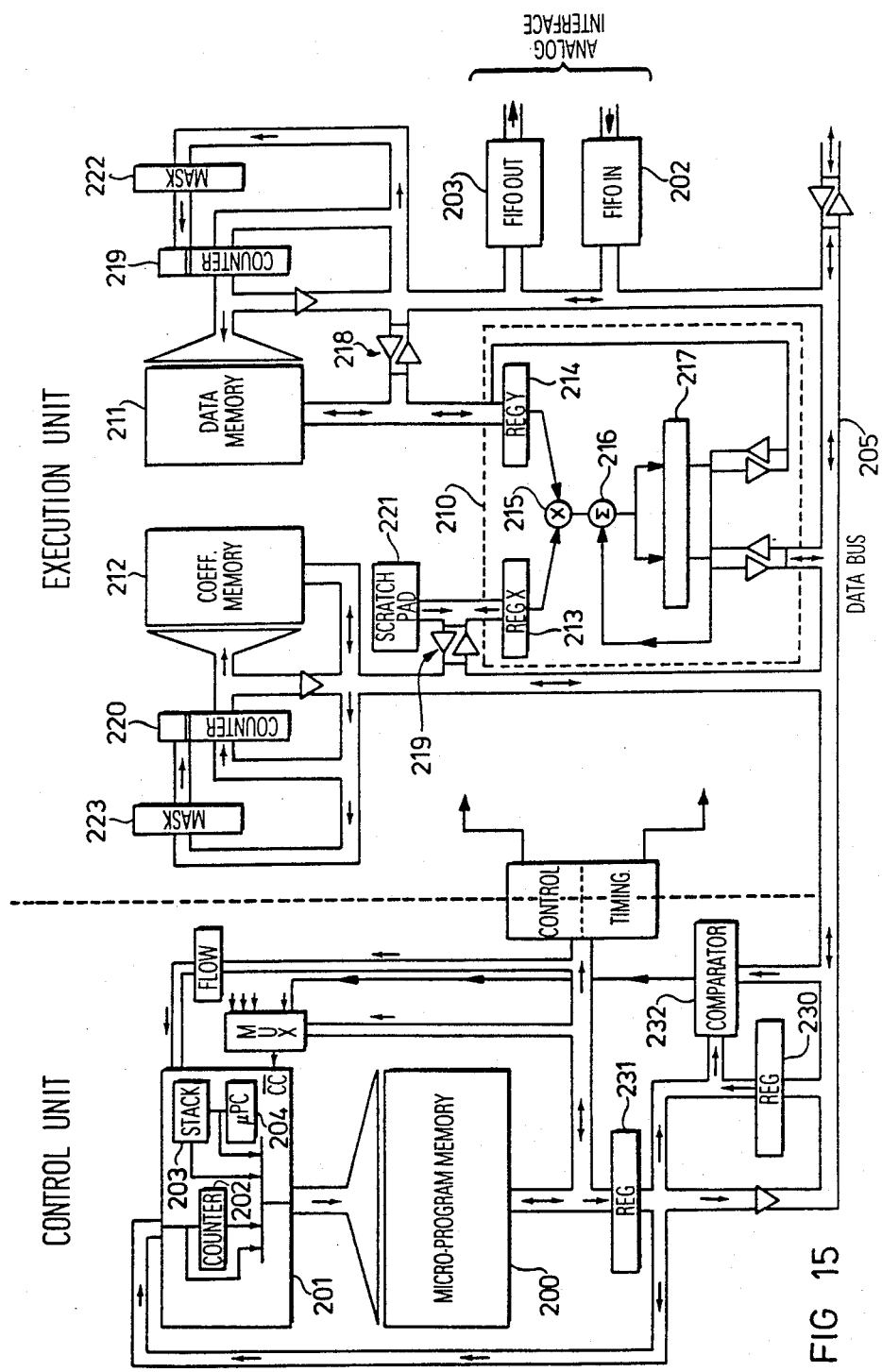
FIG. 15 is a block diagram of a sampled-data processor suitable for implementing the sampled data processing functions of the channel-impairment analyzer.

As previously mentioned, the digital signal processing effected in the data receiver and measurement sections of the analyzer may be implemented either by circuitry dedicated to each processing function or by means of a real-time sampled-data processor.

Where a sampled-data processor is used, the internal architecture of the processor is preferably optimised for the range of tasks to be performed and a suitable architecture for the present case is illustrated in FIG. 15. Since the principles of operation of such sampled-data processors and their detailed design are well understood by persons skilled in the relevant art, only a brief description of the FIG. 15 processor will be given below.

The FIG. 15 processor basically comprises two parts, namely a control unit and an execution unit. The control unit is based upon micro-programming techniques where the micro-program instruction words (micro-instructions) reside in memory 200 and an instruction sequencer 201 generates the memory address of the instruction word to be carried out. Each micro-instruction consists of the range of signals required to control both parts of the processor. The sequencer 201 includes a counter 202, stack 203 and microprogram counter 204.

Operationally, the processor may be described as a 'data-driven machine' since only the data transfer rate (input and/or output) with the analog parts of the analyzer determines the micro-program repetition period. Synchronizing to the data rate is accomplished by first-in first-out (FIFO) memories 202, 203 which link a main data bus 205 of the signal processor with the analog interface. Each program cycle is carried out at the full speed of the processor (nominally 6 instructions per micro-second) unless the input FIFO 202 is empty or the output FIFO 203 is full. In these latter two cases the program 'waits' for the appropriate data availability condition being met before continuing.

The processor execution unit is a collection of elements whose architecture has been designed to carry out the sampled data processing activities of the analyzer as efficiently as possible in real-time. Specifically, the execution unit has been optimised to carry out the function of digital convolution as efficiently as possible since this function represents the largest percentage requirement for real-time computation. For this reason, the execution unit is built around a high speed 16×16 multiplier-accumulator 210 arranged to be fed with filter tap coefficients and signal sample data simultaneously for fastest operation. The multiplier-accumulator 210 includes two input registers 213,214 respectively designated X and Y which feed a multiplier 215. The multiplier 215 is followed by an adder 216 that enables the progressive accumulation of processing results in a register 217. To achieve the simultaneous supply of tap coefficients and signal sample data to the multiplier-accumulator, the execution-unit memory has been split into two segments, called the 'data' memory 211 and the 'coefficient' memory 212 as shown. The data memory 211 is connected directly to Y input register 214 of the multiplier 210 and via bi-directional bus drivers 218, to the main data bus 205, whilst the coefficient memory is connected directly to the main data bus 205 and then to the X input register 213 via bi-directional bus drivers 219. In conjunction with the control capability of the sequencer 201, this arrangement allows a single execute-and-loop instruction to be assembled for fastest operation of the digital convolution function. An additional small overhead is required to initialize the computation by setting the filter length in the sequencer 201 and initializing address counters 219, 220 respectively associated with the data memory 211 and coefficient memory 212, (the initialization data being held either in memory 212 or in a scratchpad memory 221).

The counters 219 and 220 have the capability to cycle on a preselected fixed depth of memory which minimises the overhead required in a data storage and access; both these latter activities are controlled by a single pointer which may be held either in the scratchpad 221 or in the memory 212. The cycle depth of each counter 219,220 is individually controlled via their respective mask registers 222, 223. Additionally, the least significant bit of counter 219 may be reversed which allows complex-valued data to be stored interleaved under the control of a single pointer and thereafter to be readily unscrambled for the purpose of complex digital convolution.

The majority of the filtering activities carried out in the processing are adaptive. However, the complexity of the tap update algorithms is such that, although each filter convolution must be carried out at the required rates to maintain receiver integrity, the update procedures for each adaptive filter are multiplexed in time with only one filter being updated each symbol period. For tap coefficient updating, the error signal is held in scratchpad 221 so that, within a loop structure for multiple tap updates, counter 220 addresses the coefficient to be updated and counter 219 addresses the data component in the update algorithm. With this computational organization, the processor architecture allows a complex-valued tap coefficient to be updated within a loop structure of eight instructions.

Another extensively used algorithm is the power series expansion of mathematical functions. For this algorithm, the polynomial coefficients are held in the coefficient memory 212 and the independent variable of the function is preloaded into one of the input registers of the multiplier 210, which allows the algorithm to be implemented using the process of repeated factoring in a loop structure requiring three instructions. Thus a fifth order polynomial may be executed in six cycles of three instructions plus a small overhead for initialization purposes.

For products involving complex numbers, one variable is usually held in the scratchpad memory 221 which provides access directly to one input of the multiplier 210 so that the other variable may be addressed from either the data memory 211 or the coefficient memory 212 for access to the other free multiplier input. In addition, the scratchpad 221 is used to hold parameters such as data points and constant values which are common to the activities of several subroutines, and also to provide an area of working storage for other special subroutine activities such as autorange control and timing control.

An interface between the control unit and the execution unit is provided by means of registers 230,231. Register 230 provides the link 'execution-unit to control-unit' whilst register 231 provides the link 'control-unit to execution-unit'. Both the registers 230,231 may be used to determine sequencer branch instructions conditionally, on the basis of a comparison (effected in comparator 232) with the execution-unit data bus 205, and unconditionally, by value passed in micro-program via register 231 or by value passed from the execution-unit via register 230. In addition, the register 231 allows the sequencer counter 202 to be initialized for applications which require a fixed loop count or a branch to a fixed location whilst register 230 allows the sequencer counter 202 to be initialized dynamically under signal processing/execution control for applications which require a variable loop count.

From the foregoing, it can be seen that although the architecture of the FIG. 15 processor has been optimized for fast digital convolution (which is the most time consuming of analyzer activities that have to be carried out in real-time every data symbol interval), it incorporates features which allow the other signal processing activities to be carried out very efficiently with the minimum of noncomputational overhead Indeed, the processor may be regarded as a general purpose device suitable for a range of sampled-data signal processing activities.

We claim:

1. A non-intrusive channel-impairment measurement system for measuring at least one quasistatic impairment characteristic of a band-limited data communications channel, comprising:
    a data receiver section for receiving over said channel, data modulated onto quadrature phases of a carrier signal, the receiver section being arranged to process the received signal in two quadrature forward processing paths and comprising:
    (a) a data recovery circuit for providing signals ($d_i$, $d_q$) representing estimates of the received data based on output signals ($z_i$, $z_q$) from said forward processing paths;
    (b) decision-directed compensation means disposed in said forward processing paths and arranged to compensate for channel-impairment effects on the received signals; and
    (c) error generation means for generating error signals indicative of the difference between the estimates ($d_i$, $d_q$) and the output signals ($z_i$, $z_q$) of the forward processing paths; and
    a measurement section responsive to the error signals generated in the receiver section for deriving a measurement of signal jitter, said measurement section comprising:
    (d) filter means for receiving the error signals and deriving jitter signals ($J_{IN}(n)$) therefrom, and providing said jitter signals to an adaptive line enhancer;
    (e) the adaptive line enhancer being for isolating deterministic components of the jitter signals ($J_{IN}(n)$) from background noise, the adaptive line enhancer comprising a fixed delay arranged to receive said jitter signals, a transversal filter fed from the fixed delay and having a response dependent upon a set of tap coefficients, a comparator for providing difference signals indicative of the difference between the jitter signals and output signals ($J_{OUT}(n)$) generated by the transversal filter, and update means for adjusting the tap coefficients of the transversal filter such as to minimize the comparator difference signals; and
    (f) means responsive to $J_{out}(n)$ for providing signals indicative of signal jitter;
    wherein $J_{IN}(n)$ represents noise-corrupted jitter signals and $J_{OUT}(n)$ represents deterministic components of $J_{IN}(n)$.

2. A measurement system according to claim 1, wherein the error signals generated by the error generation means are indicative of the phase difference between ($d_i$, $d_q$) and ($z_i$, $z_q$), and $J_{IN}(n)$ represents noise-corrupted phase jitter signals; the measurement section thereby being arranged to measure phase jitter.

3. A measurement system according to claim 1, wherein the error signals generated by the error generation means are indicative of the amplitude difference between ($d_i$, $d_q$) and ($z_i$, $z_q$), and $J_{IN}(n)$ represents noise-corrupted amplitude jitter signals; the measurement section thereby being arranged to measure amplitude jitter.

4. An analyzer according to claim 1, wherein the tap coefficients of the transversal filter are updated at random multiples of the data rate.

5. A non-intrusive channel-impairment measurement system for measuring at least one quasistatic impairment characteristic of a band-limited data communications channel, comprising:

a data receiver section for receiving over said channel, data modulated onto quadrature phases of a carrier signal, the receiver section being arranged to process the received signal in two quadrature forward processing paths and comprising:
(a) a data recovery circuit for providing signals ($d_i$, $d_q$) representing estimates of the received data based on output signals ($z_i$, $z_q$) from said forward processing paths;
(b) decision-directed compensation means disposed in said forward processing paths and arranged to compensate for channel-impairment effects on the received signals; and
(c) error generation means for generating error signals indicative of the difference between the estimates ($d_i$, $d_q$) and the output signals ($z_i$, $z_q$) of the forward processing paths; and
a measurement section responsive to the error signals generated in the receiver section to derive a measurement of second order non-linear distortion, the measurement section including:
(d) first modulating means for remodulating the error signals up to the frequency of the carrier signal;
(e) second modulating means operative to frequency shift the remodulated error signals through a predefined set of frequencies of each side of the carrier signal frequency; and
(f) averaging means arranged to produce an average value of the frequency-shifted error signals at each frequency of said set of frequencies, a maximum average value defining a measure of second order non-linear distortion.

6. A non-intrusive channel-impairment measurement system for measuring at least one quasistatic impairment characteristic of a band-limited data communications channel, comprising:

a data receiver section for receiving over said channel, data modulated onto quadrature phases of a carrier signal, the receiver section being arranged to process the received signal in two quadrature forward processing paths and comprising:
(a) a data recovery circuit for providing signals ($d_i$, $d_q$) representing estimates of the received data based on output signals ($z_i$, $z_q$) from said forward processing paths;
(b) decision-directed compensation means disposed in said forward processing paths and arranged to compensate for channel-impairment effects on the received signals; and
(c) error generation means for generating error signals indicative of the difference between the estimates ($d_i$, $d_q$) and the output signals ($z_i$, $z_q$) of the forward processing paths; and
a measurement section responsive to signals generated in the receiver section to derive a measurement of at least one channel impairment characteristic, said measurement section including a real-time channel model comprising:
(d) an adaptive transversal model filter fed with the output signals ($d_i$, $d_q$) of the data recovery circuit, and having a response dependent upon a set of tap coefficients;
(e) demodulating means for demodulating an uncompensated version of the signal received over the channel, the uncompensated version being derived from the received signal prior to the received signal being input to the compensation means;
(f) comparison means for providing a signal indicative of the difference between the output of the model filter and the output of said demodulating means;
(g) update means arranged to receive said error signals from the comparison means and to update the tap coefficients of the model filter such as to minimize said difference between the outputs of the model filter and the demodulating means; and
(h) Fourier transform means for deriving the channel linear characteristics from a Fourier transform of the tap coefficients of the model filter.

7. A measurement system according to claim 6, wherein the comparison means of the channel model includes third-order non-linearity compensation means arranged to modify said error signals by an amount dependent on the amplitude of the model filter output and a third-order non-linearity coefficient supplied by the non-linearity compensation means, whereby to reduce the effect on said error signals of third-order non-linear distortion introduced by the channel.

8. A measurement system according to claim 7, further comprising coefficient determining means for adaptively determining said third order non-linearity coefficient, the coefficient determining means being responsive to the error signals to up-date a previously derived value of said coefficient and this coefficient then being supplied to said third-order non-linearity compensation means.

9. A non-intrusive channel-impairment measurement system for measuring at least one quasistatic impairment characteristic of a band-limited data communications channel, comprising:

a data receiver section for receiving over said channel, data modulated onto quadrature phases of a carrier signal, the receiver section being arranged to process the received signal in two quadrature forward processing paths and comprising:
(a) a data recovery circuit for providing signals ($d_i$, $d_q$) representing estimates of the received data based on output signals ($z_i$, $z_q$) from said forward processing paths;
(b) decision-directed compensation means disposed in said forward processing paths and arranged to compensate for channel-impairment effects on the received signals, said compensation means including a phase-locked loop operative to minimize the phase difference between the signals ($z_i$, $z_q$) input to the data recovery circuit and the signals ($d_i$, $d_q$) output from the data recovery circuit, the phase-locked loop comprising a loop filter and a phase rotator connected into the forward processing paths of the receiver section; and
(c) error generation means for generating error signals indicative of the difference between the estimates ($i$, $d_q$) and the output signals ($z_i$, $z_q$) of the forward processing paths; and
a measurement section responsive to the error signals generated in the receiver section comprising an adaptive line enhancer for isolating deterministic components of the jitter signals ($J_{IN}(n)$) from background noise, the adaptive line enhancer comprising a fixed delay arranged to receive said jitter signals, a transversal filter fed from the fixed delay and having a response dependent upon a set of tap coefficients, a comparator for providing difference signals indicative of the difference between the jitter signals and output signals ($J_{OUT}(n)$) generated by the transversal filter, and update means for adjusting the tap coefficients of the transversal filter such as to minimize the comparator difference signals;

wherein $J_{IN}(n)$ represents noise-corrupted jitter signals and $J_{OUT}(n)$ represents deterministic components of $J_{IN}(n)$.

10. A non-intrusive channel-impairment measurement system for measuring at least one quasistatic impairment characteristic of a band-limited data communications channel, comprising:

a data receiver section for receiving over said channel, data modulated onto quadrature phases of a carrier signal, the receiver section being arranged to process the received signal in two quadrature forward processing paths and comprising:

(a) a data recovery circuit for providing signals ($d_i$, $d_q$) representing estimates of the received data based on output signals ($z_i$, $z_q$) from said forward processing paths;

(b) decision-directed compensation means disposed in said forward processing paths and arranged to compensate for channel-impairment effects on the received signals; and (c) error generation means for generating error signals indicative of the difference between the estimates ($d_i$, $d_q$) and the output signals ($z_i$, $z_q$) of the forward processing paths; and a measurement section responsive to signals generated in the receiver section for deriving a measurement of at least one channel impairment, said measurement section including third-order non-linearity compensation means arranged to modify said error signals by an amount dependent on the amplitude of the output signals ($d_i$, $d_q$) of the data recovery circuit and a third-order non-linearity coefficient supplied to the non-linearity compensation means by coefficient determining means for adaptively determining said third-order non-linearity coefficient, the coefficient determining means being responsive to said error signals, whereby to reduce the effect on said error signals of third-order non-linear distortion introduced by the channel.

* * * * *